United States Patent
Lu et al.

(10) Patent No.: US 7,085,639 B2
(45) Date of Patent: Aug. 1, 2006

(54) SYSTEM AND METHOD FOR CHARACTERIZING THE ROAD BANK FOR VEHICLE ROLL STABILITY CONTROL

(75) Inventors: Jianbo Lu, Livonia, MI (US); Stephen Varghese Samuel, Detroit, MI (US); Todd Allen Brown, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 128 days.

(21) Appl. No.: 10/610,280

(22) Filed: Jun. 30, 2003

(65) Prior Publication Data

US 2004/0030475 A1 Feb. 12, 2004

Related U.S. Application Data

(60) Provisional application No. 60/400,375, filed on Aug. 1, 2002, provisional application No. 60/400,261, filed on Aug. 1, 2002, provisional application No. 60/400,172, filed on Aug. 1, 2002, and provisional application No. 60/400,376, filed on Aug. 1, 2002.

(51) Int. Cl.
*B60T 8/00* (2006.01)

(52) U.S. Cl. ............... 701/45; 701/36; 701/38; 701/72; 701/75; 180/197; 280/755

(58) Field of Classification Search ........... 701/36, 701/38, 45, 72, 75; 180/197; 280/755; 303/146
See application file for complete search history.

(56) References Cited

U.S. PATENT DOCUMENTS

| | | | |
|---|---|---|---|
| 2,917,126 A | 12/1959 | Phillips | |
| 3,604,273 A | 9/1971 | Kwok et al. | |
| 3,608,925 A | 9/1971 | Murphy | |
| 3,899,028 A | 8/1975 | Morris et al. | |
| 3,948,567 A | 4/1976 | Kasselmann et al. | |
| 3,972,543 A | 8/1976 | Presley et al. | |
| 4,023,864 A | 5/1977 | Lang et al. | |
| RE30,550 E | 3/1981 | Reise | |
| 4,480,714 A | 11/1984 | Yabuta et al. | |

(Continued)

FOREIGN PATENT DOCUMENTS

| | | |
|---|---|---|
| DE | 36 16 907 | 11/1987 |
| DE | 38 15 938 | 11/1989 |
| DE | 43 21 571 | 1/1994 |

(Continued)

OTHER PUBLICATIONS

A method for reducing on–road rollovers—anti–rollover braking, Thomas J. Wielenga, Dynamotive, LLC, International Congress and Exposition, Detroit, Michigan, Mar. 1–4, 1999.

Eger, R., Majjad, R., Naser, N., "Rollover simulation based on a nonlinear model", SAE 98020.

(Continued)

*Primary Examiner*—Thomas G. Black
*Assistant Examiner*—Eric M. Gibson
(74) *Attorney, Agent, or Firm*—Frederick V. Owens

(57) ABSTRACT

A control system (18) for an automotive vehicle (10) having a vehicle body has a roll angular rate sensor (34) generating a roll angular rate signal corresponding to an roll angular motion of the vehicle body. A controller (26) is coupled to roll rate sensor and a plurality of sensors. The controller (26) generates a linear road bank angle, first reference bank angle and a relative roll angle in response to the roll angle generator and the plurality of sensor signals. The controller (26) determines a first reference bank angle and generates a second reference bank angle in response to linear bank angle and a first reference bank angle, a bank angle adjustment factor. The bank angle adjustment is a function of a relative roll angle estimate. The controller (26) controls the safety system in response to the second reference bank angle estimate.

41 Claims, 6 Drawing Sheets

U.S. PATENT DOCUMENTS

| | | |
|---|---|---|
| 4,592,565 A | 6/1986 | Eagle |
| 4,597,462 A | 7/1986 | Sano et al. |
| 4,650,212 A | 3/1987 | Yoshimura |
| 4,679,808 A | 7/1987 | Ito et al. |
| 4,690,553 A | 9/1987 | Fukamizu et al. |
| 4,761,022 A | 8/1988 | Ohashi |
| 4,765,649 A | 8/1988 | Ikemoto et al. |
| 4,767,588 A | 8/1988 | Ito |
| 4,778,773 A | 10/1988 | Sukegawa |
| 4,809,183 A | 2/1989 | Eckert |
| 4,827,416 A | 5/1989 | Kawagoe et al. |
| 4,872,116 A | 10/1989 | Ito et al. |
| 4,888,696 A | 12/1989 | Akatsu et al. |
| 4,898,431 A | 2/1990 | Karnopp et al. |
| 4,930,082 A | 5/1990 | Harara et al. |
| 4,951,198 A | 8/1990 | Watanabe et al. |
| 4,960,292 A | 10/1990 | Sadler |
| 4,964,679 A | 10/1990 | Rath |
| 4,967,865 A | 11/1990 | Schindler |
| 4,976,330 A | 12/1990 | Matsumoto |
| 4,998,593 A | 3/1991 | Karnopp et al. |
| 5,033,770 A | 7/1991 | Kamimura et al. |
| 5,058,017 A | 10/1991 | Adachi et al. |
| 5,066,041 A | 11/1991 | Kindermann et al. |
| 5,088,040 A | 2/1992 | Matsuda et al. |
| 5,089,967 A | 2/1992 | Haseda et al. |
| 5,163,319 A | 11/1992 | Spies et al. |
| 5,200,896 A | 4/1993 | Sato et al. |
| 5,208,749 A | 5/1993 | Adachi et al. |
| 5,224,765 A | 7/1993 | Matsuda |
| 5,228,757 A | 7/1993 | Ito et al. |
| 5,239,868 A | 8/1993 | Takenaka et al. |
| 5,247,466 A | 9/1993 | Shimada et al. |
| 5,261,503 A | 11/1993 | Yasui |
| 5,265,020 A | 11/1993 | Nakayama |
| 5,278,761 A | 1/1994 | Ander et al. |
| 5,282,134 A | 1/1994 | Gioutsos et al. |
| 5,311,431 A | 5/1994 | Cao et al. |
| 5,324,102 A | 6/1994 | Roll et al. |
| 5,335,176 A | 8/1994 | Nakamura |
| 5,365,439 A | 11/1994 | Momose et al. |
| 5,370,199 A | 12/1994 | Akuta et al. |
| 5,408,411 A | 4/1995 | Nakamura et al. |
| 5,446,658 A | 8/1995 | Pastor et al. |
| 5,510,989 A | 4/1996 | Zabler et al. |
| 5,548,536 A | 8/1996 | Ammon |
| 5,549,328 A | 8/1996 | Cubalchini |
| 5,579,245 A | 11/1996 | Kato |
| 5,598,335 A | 1/1997 | You |
| 5,602,734 A | 2/1997 | Kithil |
| 5,610,575 A | 3/1997 | Gioutsos |
| 5,627,756 A | 5/1997 | Fukada et al. |
| 5,634,698 A | 6/1997 | Cao et al. |
| 5,640,324 A | 6/1997 | Inagaki |
| 5,648,903 A | 7/1997 | Liubakka |
| 5,671,982 A | 9/1997 | Wanke |
| 5,676,433 A | 10/1997 | Inagaki et al. |
| 5,694,319 A | 12/1997 | Suissa et al. |
| 5,703,776 A | 12/1997 | Soung |
| 5,707,117 A | 1/1998 | Hu et al. |
| 5,707,120 A | 1/1998 | Monzaki et al. |
| 5,720,533 A | 2/1998 | Pastor et al. |
| 5,723,782 A | 3/1998 | Bolles, Jr. |
| 5,732,377 A | 3/1998 | Eckert |
| 5,732,378 A | 3/1998 | Eckert et al. |
| 5,732,379 A | 3/1998 | Eckert et al. |
| 5,736,939 A | 4/1998 | Corcoran |
| 5,737,224 A | 4/1998 | Jeenicke et al. |
| 5,740,041 A | 4/1998 | Iyoda |
| 5,742,918 A | 4/1998 | Ashrafi et al. |
| 5,742,919 A | 4/1998 | Ashrafi et al. |
| 5,762,406 A | 6/1998 | Yasui et al. |
| 5,782,543 A | 7/1998 | Monzaki et al. |
| 5,787,375 A | 7/1998 | Madau et al. |
| 5,801,647 A | 9/1998 | Survo et al. |
| 5,809,434 A | 9/1998 | Ashrafi et al. |
| 5,816,670 A | 10/1998 | Yamada et al. |
| 5,825,284 A | 10/1998 | Dunwoody et al. |
| 5,857,535 A | 1/1999 | Brooks |
| 5,869,943 A | 2/1999 | Nakashima et al. |
| 5,878,357 A | 3/1999 | Sivashankar et al. |
| 5,893,896 A | 4/1999 | Imamura et al. |
| 5,925,083 A | 7/1999 | Ackermann |
| 5,931,546 A | 8/1999 | Nakashima et al. |
| 5,944,137 A | 8/1999 | Moser et al. |
| 5,944,392 A | 8/1999 | Tachihata et al. |
| 5,946,644 A | 8/1999 | Cowan et al. |
| 5,964,819 A | 10/1999 | Naito |
| 5,971,503 A | 10/1999 | Joyce et al. |
| 6,002,974 A | 12/1999 | Schiffmann |
| 6,002,975 A | 12/1999 | Schiffmann et al. |
| 6,026,926 A | 2/2000 | Noro et al. |
| 6,038,495 A | 3/2000 | Schiffmann |
| 6,040,916 A | 3/2000 | Griesinger |
| 6,050,360 A | 4/2000 | Pattok et al. |
| 6,055,472 A | 4/2000 | Breunig et al. |
| 6,062,336 A | 5/2000 | Amberkar et al. |
| 6,065,558 A | 5/2000 | Wielenga |
| 6,073,065 A | 6/2000 | Brown et al. |
| 6,079,513 A | 6/2000 | Nishizaki et al. |
| 6,081,761 A | 6/2000 | Harada et al. |
| 6,085,860 A | 7/2000 | Hackl et al. |
| 6,086,168 A | 7/2000 | Rump |
| 6,089,344 A | 7/2000 | Baughn et al. |
| 6,104,284 A | 8/2000 | Otsuka |
| 6,122,568 A | 9/2000 | Madau et al. |
| 6,122,584 A | 9/2000 | Lin et al. |
| 6,129,172 A | 10/2000 | Yoshida |
| 6,141,604 A | 10/2000 | Mattes et al. |
| 6,141,605 A | 10/2000 | Joyce |
| 6,144,904 A | 11/2000 | Tseng |
| 6,149,251 A | 11/2000 | Wuerth et al. |
| 6,161,905 A | 12/2000 | Hac et al. |
| 6,169,939 B1 | 1/2001 | Raad et al. |
| 6,176,555 B1 | 1/2001 | Semsey |
| 6,178,375 B1 | 1/2001 | Breunig |
| 6,179,310 B1 | 1/2001 | Clare et al. |
| 6,179,394 B1 | 1/2001 | Browalski et al. |
| 6,184,637 B1 | 2/2001 | Yamawaki et al. |
| 6,185,485 B1 | 2/2001 | Ashrafi et al. |
| 6,186,267 B1 | 2/2001 | Hackl et al. |
| 6,192,305 B1 | 2/2001 | Schiffmann |
| 6,195,606 B1 | 2/2001 | Barta et al. |
| 6,198,988 B1 | 3/2001 | Tseng |
| 6,202,009 B1 | 3/2001 | Tseng |
| 6,202,020 B1 | 3/2001 | Kyrtsos |
| 6,206,383 B1 | 3/2001 | Burdock |
| 6,219,604 B1 | 4/2001 | Dilger et al. |
| 6,223,114 B1 | 4/2001 | Boros et al. |
| 6,226,579 B1 | 5/2001 | Hackl et al. |
| 6,233,510 B1 | 5/2001 | Platner et al. |
| 6,263,261 B1 | 7/2001 | Brown et al. |
| 6,266,596 B1 | 7/2001 | Hartman et al. |
| 6,272,420 B1 | 8/2001 | Schramm et al. |
| 6,278,930 B1 | 8/2001 | Yamada et al. |
| 6,282,471 B1 | 8/2001 | Burdock et al. |
| 6,282,472 B1 | 8/2001 | Jones et al. |
| 6,282,474 B1 | 8/2001 | Chou et al. |
| 6,292,734 B1 | 9/2001 | Murakami et al. |
| 6,292,759 B1 | 9/2001 | Schiffmann |
| 6,311,111 B1 | 10/2001 | Leimbach et al. |

| | | | |
|---|---|---|---|
| 6,314,329 B1 | 11/2001 | Madau et al. | |
| 6,315,373 B1 | 11/2001 | Yamada et al. | |
| 6,321,141 B1 | 11/2001 | Leimbach | |
| 6,324,446 B1 | 11/2001 | Brown et al. | |
| 6,324,458 B1 | 11/2001 | Takagi et al. | |
| 6,330,522 B1 | 12/2001 | Takeuchi | |
| 6,332,104 B1 | 12/2001 | Brown et al. | |
| 6,338,012 B1 | 1/2002 | Brown et al. | |
| 6,349,247 B1 | 2/2002 | Schramm et al. | |
| 6,351,694 B1 | 2/2002 | Tseng et al. | |
| 6,352,318 B1 | 3/2002 | Hosomi et al. | |
| 6,356,188 B1 | 3/2002 | Meyers et al. | |
| 6,370,938 B1 | 4/2002 | Leimbach et al. | |
| 6,394,240 B1 | 5/2002 | Barwick | |
| 6,397,127 B1 | 5/2002 | Meyers et al. | |
| 6,419,240 B1 | 7/2002 | Burdock et al. | |
| 6,428,118 B1 | 8/2002 | Blosch | |
| 6,438,464 B1 | 8/2002 | Woywod et al. | |
| 6,477,480 B1 | 11/2002 | Tseng et al. | |
| 6,496,758 B1 | 12/2002 | Rhode et al. | |
| 6,496,763 B1 | 12/2002 | Griessbach | |
| 6,498,976 B1 | 12/2002 | Ehlbeck et al. | |
| 6,529,803 B1 | 3/2003 | Meyers et al. | |
| 6,547,022 B1 | 4/2003 | Hosomi et al. | |
| 6,554,293 B1 | 4/2003 | Fennel et al. | |
| 6,556,908 B1 | 4/2003 | Lu et al. | |
| 6,559,634 B1 | 5/2003 | Yamada | |
| 2002/0014799 A1 | 2/2002 | Nagae | |
| 2002/0040268 A1 | 4/2002 | Yamada et al. | |
| 2002/0056582 A1 | 5/2002 | Chubb | |
| 2002/0075139 A1 | 6/2002 | Yamamoto et al. | |
| 2002/0082749 A1 * | 6/2002 | Meyers et al. | 701/1 |
| 2002/0096003 A1 | 7/2002 | Yamada et al. | |
| 2002/0139599 A1 | 10/2002 | Lu | |
| 2003/0182025 A1 | 9/2003 | Tseng et al. | |

FOREIGN PATENT DOCUMENTS

| | | |
|---|---|---|
| DE | 42 27 886 | 2/1994 |
| DE | 43 35 979 | 4/1995 |
| DE | 43 42 732 | 6/1995 |
| DE | 199 07 633 | 10/1999 |
| EP | 0 430 813 | 12/1993 |
| EP | 0 662 601 | 7/1995 |
| EP | 0 758 601 | 2/1997 |
| EP | 983919 A2 * | 3/2000 |
| FR | 24 25 342 | 12/1979 |
| GB | 2257403 | 1/1993 |
| GB | 2 342 078 | 4/2000 |
| JP | 62055211 | 9/1985 |
| JP | 63116918 | 5/1988 |
| JP | 63151539 | 6/1988 |
| JP | 63203456 | 8/1988 |
| JP | 1101238 | 4/1989 |
| JP | 2171373 | 7/1990 |
| JP | 3042360 | 2/1991 |
| JP | 3045452 | 2/1991 |
| JP | 4008837 | 1/1992 |
| JP | 5016699 | 1/1993 |
| JP | 5254406 | 10/1993 |
| JP | 6278586 | 10/1994 |
| JP | 6297985 | 10/1994 |
| JP | 6312612 | 11/1994 |
| JP | 8080825 | 3/1996 |
| JP | 9005352 | 1/1997 |
| JP | 10024819 | 1/1998 |
| JP | 10329682 | 12/1998 |
| JP | 11011272 | 1/1999 |
| JP | 11170992 | 6/1999 |
| JP | 11254992 | 9/1999 |
| JP | 11255093 | 9/1999 |
| JP | 11304663 | 10/1999 |
| JP | 11304662 | 11/1999 |
| SU | 816849 | 3/1981 |
| WO | WO 02/20318 A1 | 3/2002 |

OTHER PUBLICATIONS

Nalecz, A.G., Bindemann, A.C., Brewer H.K., "Dynamic analysis of vehicle rollover", $12^{th}$ International Conference on Experimental Safety Vehicles, Goteborg, Sweden, May 29–Jun. 1, 1989.

Niii, N., Nishijima, Y., Nakagaw, K., "rollover analysis method of a large–size bus", JSAE 9540020, 1995.

Eger, R., Kiencke, U., "Modeling of rollover sequences", Control Engineering Practice 11 (2003) 209–216.

* cited by examiner

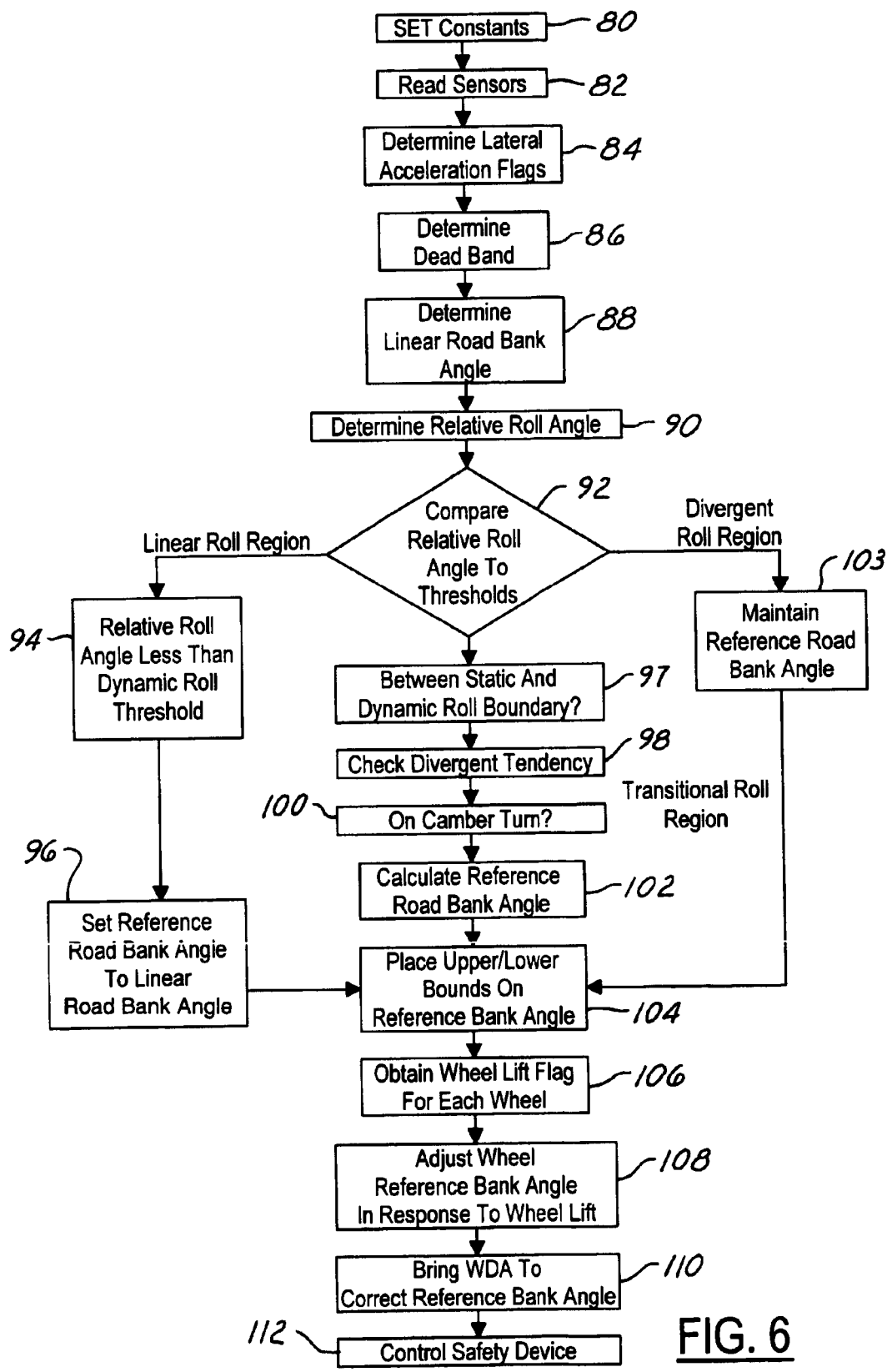

SYSTEM AND METHOD FOR CHARACTERIZING THE ROAD BANK FOR VEHICLE ROLL STABILITY CONTROL

RELATED APPLICATIONS

The present invention claims priority to U.S. provisional application Ser. Nos. 60/400,261, 60/400,172, 60/400,375, and 60/400,376, filed Aug. 1, 2002, the disclosures of which are incorporated by reference herein. The present invention is also related to U.S. Application Ser. No 10/610,279 entitled "SYSTEM AND METHOD FOR CHARACTERIZING VEHICLE BODY TO ROAD ANGLE FOR VEHICLE ROLL STABILITY CONTROL", and Ser. No. 10/610,278 entitled "SYSTEM AND METHOD FOR DETERMINING A WHEEL DEPARTURE ANGLE FOR A ROLLOVER CONTROL SYSTEM", filed simultaneously herewith.

TECHNICAL FIELD

The present application relates generally to a control apparatus for controlling a system of an automotive vehicle in response to sensed dynamic behavior, and more specifically, to a method and apparatus for controlling the roll characteristics of the vehicle by characterizing the road bank on which the vehicle is having a potential rollover event.

BACKGROUND

Dynamic control systems for automotive vehicles have recently begun to be offered on various products. Dynamic control systems typically control the yaw of the vehicle by controlling the braking effort at the various wheels of the vehicle. Yaw control systems typically compare the desired direction of the vehicle based upon the steering wheel angle and the direction of travel. By regulating the amount of braking at each corner of the vehicle, the desired direction of travel may be maintained. Typically, the dynamic control systems do not address roll of the vehicle. For high profile vehicles in particular, it would be desirable to control the rollover characteristic of the vehicle to maintain the vehicle position with respect to the road. That is, it is desirable to maintain contact of each of the four tires of the vehicle on the road.

In vehicle roll stability control it is desired to alter the vehicle attitude such that its motion along the roll direction is prevented from achieving a predetermined limit (rollover limit) with the aid of the actuation from the available active systems such as controllable brake system, steering system and suspension system. Although the vehicle attitude is well defined, direct measurement is usually impossible.

There are two types of vehicle attitudes needed to be distinguished. One is the so-called global attitude, which is sensed by the angular rate sensors. The other is the relative attitude, which measures the relative angular positions of the vehicle with respect to the road surface on which the vehicle is driven. The global attitude of the vehicle is relative to an earth frame (or called the inertia frame), sea level, or a flat road. It can be directly related to the three angular rate gyro sensors. While the relative attitude of the vehicle measures the relative angular positions of the vehicle with respect to the road surface, which are always of various terrains. Unlike the global attitude, there are no gyro-type sensors that can be directly related to the relative attitude. A reasonable estimate is that a successful relative attitude sensing system utilizes both the gyro-type sensors (when the road becomes flat, the relative attitude sensing system recovers the global attitude) and some other sensor signals.

One reason to distinguish relative and global attitude is due to the fact that vehicles are usually driven on a three-dimensional road surface of different terrains, not always on a flat road surface. Driving on a road surface with a large road bank does increase the rollover tendency, i.e., a large output from the global attitude sensing system might well imply an uncontrollable rollover event regardless of the flat road driving and the 3-D road driving. However driving on a three-dimensional road with moderate road bank angle, the global attitude may not be able to provide enough fidelity for a rollover event to be distinguished. Vehicular rollover happens when one side of the vehicle is lifted from the road surface with a long duration of time without returning back. If a vehicle is driven on a banked road, the global attitude sensing system will pick up certain attitude information even when the vehicle does not experience any wheel lifting (four wheels are always contacting the road surface). Hence a measure of the relative angular positions of the vehicle with respect to the portion of the road surface on which the vehicle is driven provides more fidelity than global attitude to sense the rollover event when the vehicle is driven on a road with a moderate bank angle. Such an angle is called body-to-road roll angle and it is used as one of the key variables in the roll stability control module to compute the amount of actuation needed for preventing untripped rollover event.

When the vehicle does not have one side lifted, U.S. Pat. No. 6,556,908 does provide a method to calculate the relative attitudes and their accuracy may be affected by the vehicle loading, suspension and tire conditions. However, during a potential rollover event, such a relative roll angle is not a good measure of the true relative roll angle between vehicle body and the road surface. U.S. patent application Ser. No. 10/459,697 provides another way to compute the true relative roll angle during a potential rollover event. This application is suited for cases where vehicle loading and suspension conditions are very close to the nominal systems. If the vehicle has large loading variations (especially roof loading), potential inaccuracy could cause false activations in roll stability controls.

During a potential rollover event, one or two wheels on the inside of the vehicle turn are up in the air and there is an angle between the axle of the lifted wheel and road surface. Such an angle is called a wheel departure angle. If such a wheel departure can be somehow characterized, the true body-to-road roll angle can be conceptually obtained as the sum of the wheel departure angle and the relative roll angle calculated in U.S. Pat. No. 6,556,908.

Another way to capture the true body-to-road roll angle is to use the resultant angle obtained by subtracting the road bank angle for the global roll angle calculated for example in U.S. patent application Ser. No. 09/967,038, filed Oct. 1, 2001. Although this method is theoretically feasible, it has inevitable drawbacks. The first drawback lies in the computation of the road bank angle, since there is no robust and accurate computation of road banks using the existing sensor set. Secondly, the global roll angle computation as shown in U.S. patent application Ser. No. 09/967,038 may be affected by the accuracy of the low frequency bank angle estimation.

Therefore, the aforementioned two methods of computing the body-to-road roll angle may not deliver accurate enough body-to-road roll angle for roll stability control purpose in certain situations. Because each of the individual methods described above does provide accurate measure with certain conditions, a sensor fusion algorithm would be a way to obtain an angle good for roll stability control. Such a sensor fusion method needs to integrate the various angles and conduct signal sensitizing and desensitizing, which may include the computations of (i) global roll angle as discussed in U.S. patent application Ser. No. 09/967,038; (ii) relative roll angle as discussed in U.S. Pat. No. 6,556,908; (iii) a rough characterization of the road bank angle, which is called a reference road bank angle); (iv) wheel departure angle; (v) body-to-road roll angle; (vi) transition and rollover condition.

The aforementioned computation is not only good for roll stability control, but also for other applications. For example, the reference road bank angle could be used in an active anti-roll-bar control, the yaw stability control, etc. An active roll control system using a controlled anti-roll-bar does not respond suitably to the side bank in the conventional setting, since the presence of road side bank cannot be detected and the system therefore responds to a side bank as if the vehicle were cornering. This can result in unnecessary power consumption for the active anti-roll-bar system. In order to eliminate this, U.S. Pat. No. 6,282,471 provides a very crude estimation of the road side bank using lateral acceleration sensor and vehicle reference speed. A vehicle driven on a road with a sharp side bank may cause false activation for the yaw stability control system and/or roll stability control system due to the fact that large lateral motion is determined through sensor signals even if the vehicle is driven in steady state condition on the banked road.

Therefore, it is desirable in vehicle dynamics control, especially for roll stability control to detect accurately a wheel departure angle so as to accurately predict the true roll position of the vehicle to properly activate the vehicle control systems.

SUMMARY

A system for determining a reference road bank angle is set forth herein. The process may be iterative and continuous so that a previous or first road bank angle determination or estimate is used to find an updated or second reference road bank angle.

In one embodiment, a control system for an automotive vehicle having a vehicle body has a roll angular rate sensor generating a roll angular rate signal corresponding to a roll angular motion of the vehicle body. A controller is coupled to a roll rate sensor and a plurality of sensors. The controller generates a linear road bank angle, first reference bank angle and a relative roll angle in response to the roll angle generator and the plurality of sensor signals. The controller determines a first reference bank angle and generates a second reference bank angle in response to linear bank angle and a first reference bank angle, a bank angle adjustment factor. The bank angle adjustment is a function of a relative roll angle estimate. The controller controls the safety system in response to the second reference bank angle estimate.

In another embodiment, a method of controlling a safety system of an automotive vehicle comprises determining a linear road bank angle, determining whether the vehicle is operating in a linear roll region, a transitional roll region or a divergent roll region. When the vehicle is operating in the linear roll region, generating a second reference bank angle in response to a global roll and a linear bank angle adjustment factor. When the vehicle is operating in the transitional roll region, generating a second reference bank angle in response to a first reference bank angle and a bank angle adjustment factor. The bank angle adjustment is a function of a relative roll angle estimate. When the vehicle is operating in the divergent region, holding constant the reference bank angle and controlling a safety system in response to the second reference road bank angle.

Other advantages and features of the present invention will become apparent when viewed in light of the detailed description of the preferred embodiment when taken in conjunction with the attached drawings and appended claims.

BRIEF DESCRIPTION OF THE DRAWINGS

FIG. 6 is flow chart of the operation of one embodiment of the present invention.

DETAILED DESCRIPTION

Figure 1:
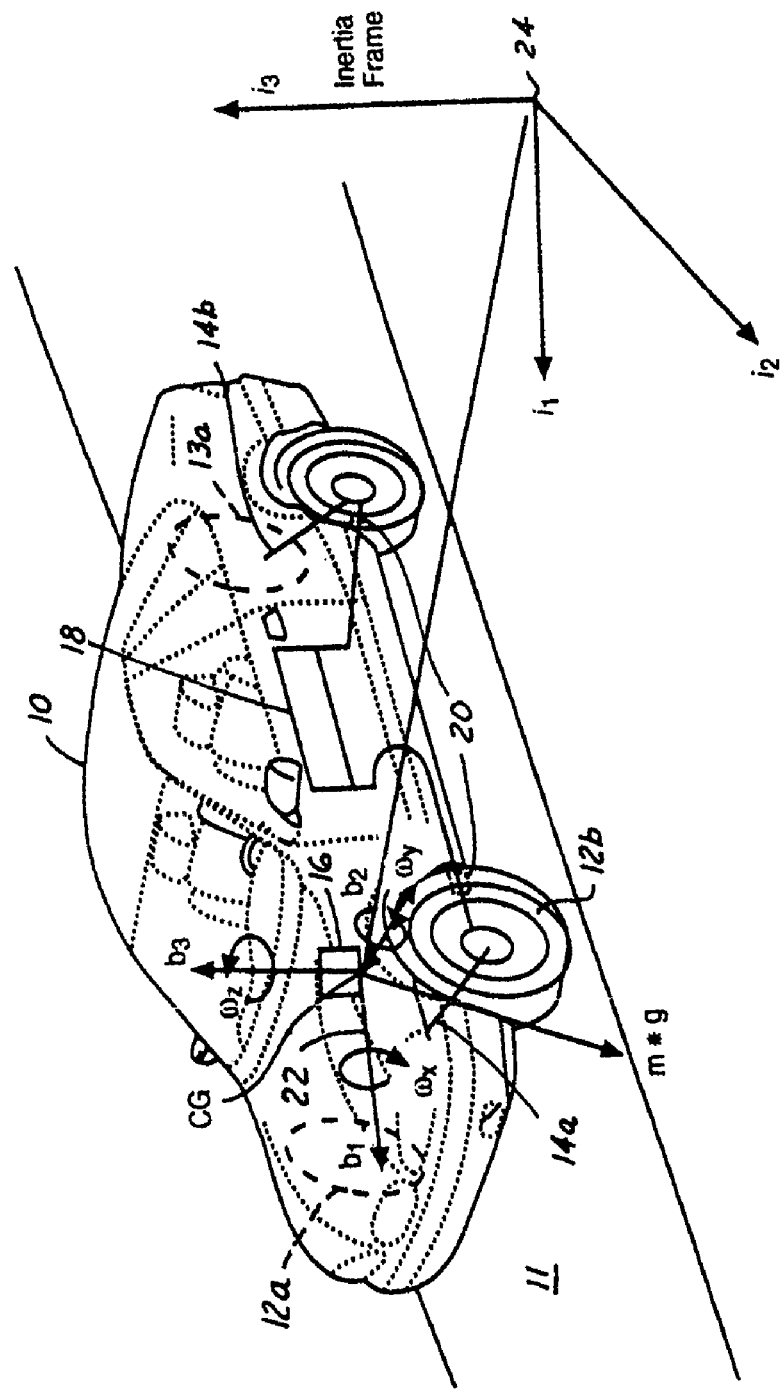
FIG. 1 is a diagrammatic view of a vehicle with variable vectors and coordinator frames.

In the following figures the same reference numerals will be used to identify the same components. The present teachings may be used in conjunction with a yaw control system or a rollover control system for an automotive vehicle. However, the present teachings may also be used with a deployment device such as airbag or roll bar.

Referring to FIG. 1, an automotive vehicle 10 on a road surface 11 with a safety system is illustrated with the various forces and moments thereon. Vehicle 10 has front right and front left tires 12a and 12b and rear right and rear left tires 13a and 13b, respectively. The vehicle 10 may also have a number of different types of front steering systems 14a and rear steering systems 14b including having each of the front and rear wheels configured with a respective controllable actuator, the front and rear wheels having a conventional type system in which both of the front wheels are controlled together and both of the rear wheels are controlled together, a system having conventional front steering and independently controllable rear steering for each of the wheels, or vice versa. Generally, the vehicle has a weight represented as Mg at the center of gravity of the vehicle, where g=9.8 m/s$^2$ and M is the total mass of the vehicle.

As mentioned above, the system may also be used with active/semi-active suspension systems, anti-roll bar or other safety devices deployed or activated upon sensing predetermined dynamic conditions of the vehicle.

The sensing system 16 is part of a control system 18. The sensing system 16 may use a standard yaw stability control sensor set (including lateral acceleration sensor, yaw rate sensor, steering angle sensor and wheel speed sensor) together with a roll rate sensor and a longitudinal acceleration sensor. The various sensors will be further described below. The wheel speed sensors 20 are mounted at each corner of the vehicle, and the rest of the sensors of sensing system 16 may be mounted directly on the center of gravity of the vehicle body, along the directions x,y and z shown in FIG. 1. As those skilled in the art will recognize, the frame from $b_1$, $b_2$ and $b_3$ is called a body frame 22, whose origin is located at the center of gravity of the car body, with the $b_1$ corresponding to the x axis pointing forward, $b_2$ corresponding to the y axis pointing off the driving side (to the left), and the $b_3$ corresponding to the z axis pointing upward. The angular rates of the car body are denoted about their respective axes as $\omega_x$ for the roll rate, $\omega_y$ for the pitch rate and $\omega_z$ for the yaw rate. The calculations set forth herein may take place in an inertial frame 24 that may be derived from the body frame 22 as described below.

The angular rate sensors and the acceleration sensors are mounted on the vehicle car body along the body frame directions $b_1$, $b_2$ and $b_3$, which are the x-y-z axes of the vehicle's sprung mass.

The longitudinal acceleration sensor 36 is mounted on the car body located at the center of gravity, with its sensing direction along $b_1$-axis, whose output is denoted as $a_x$. The lateral acceleration sensor 32 is mounted on the car body located at the center of gravity, with its sensing direction along, $b_2$-axis, whose output is denoted as $a_y$.

The other frame used in the following discussion includes the road frame, as depicted in FIG. 1. The road frame system $r_1 r_2 r_3$ is fixed on the driven road surface, where the $r_3$ axis is along the average road normal direction computed from the normal directions of the four-tire/road contact patches.

In the following discussion, the Euler angles of the body frame $b_1 b_2 b_3$ with respect to the road frame $r_1 r_2 r_3$ are denoted as $\theta_{xr}$, $\theta_{yr}$ and $\theta_{zr}$, which are also called the relative Euler angles.

Figure 2:
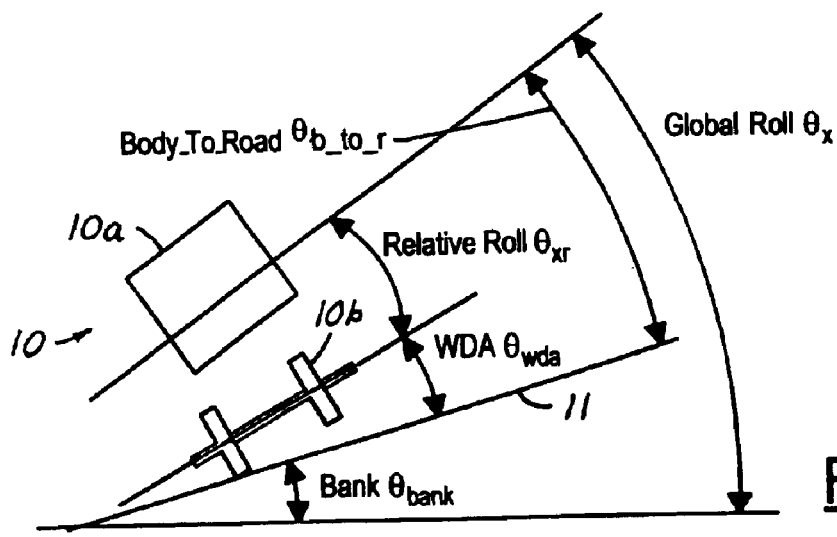
FIG. 2 is an end view of an automotive vehicle on a bank with definitions of various angles including global roll angle, relative roll angle, wheel departure angle (WDA), road bank angle and body-to-road angle.

Referring now to FIG. 2, the relationship of the various angles of the vehicle 10 relative to the road surface 11 is illustrated. The present teaching determines a wheel departure angle $\theta_{wda}$, which is the angle from the axle or the wheel axis to the road surface 11. Also shown is a reference road bank angle $\theta_{bank}$, which is shown relative to the vehicle 10 on a road surface. The vehicle 10 has a vehicle body 10a and vehicle suspension 10b. The relative roll angle $\theta_{xr}$ is the angle between the wheel axle and the body 10a. The global roll angle $\theta_x$ is the angle between the horizontal plane (e.g., at sea level) and the vehicle body 10a.

Figure 3A:
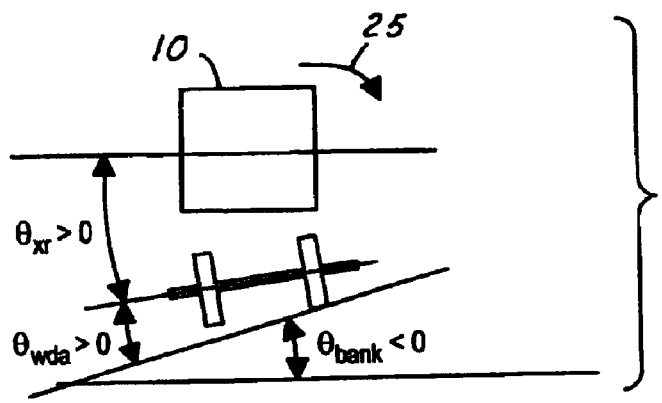
FIG. 3A is an end view of an on-camber divergent vehicle tendency.

Referring now to FIG. 3A, vehicle 10 is illustrated in an on-camber divergent state. The on-camber divergent state refers to the vehicle having a greater than 0 wheel departure angle, a greater than 0 relative roll angle, and a moment represented by arrow 25 tending to increase the relative roll angle and the wheel departure angle. In this example, the bank angle is less than 0.

Figure 3B:
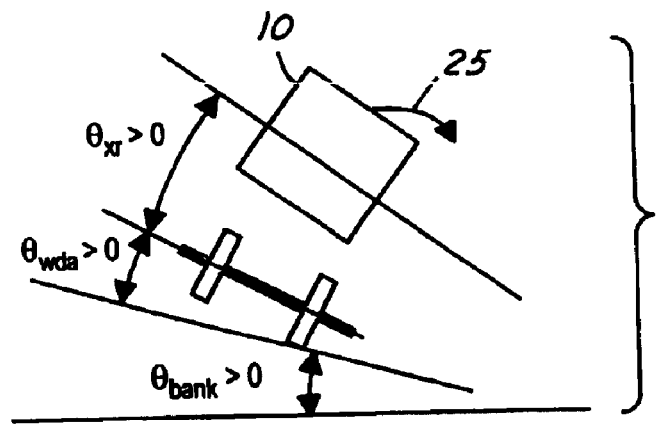
FIG. 3B is an end view of an automotive vehicle in an off-camber divergent condition.

In FIG. 3B, when the bank angle is greater than 0, the wheel departure angle is greater than 0, the relative roll angle is greater than 0 and the moment is also to the right or increasing the relative roll angle and the wheel departure angle, the vehicle is in an off-camber divergent state.

Figure 3C:
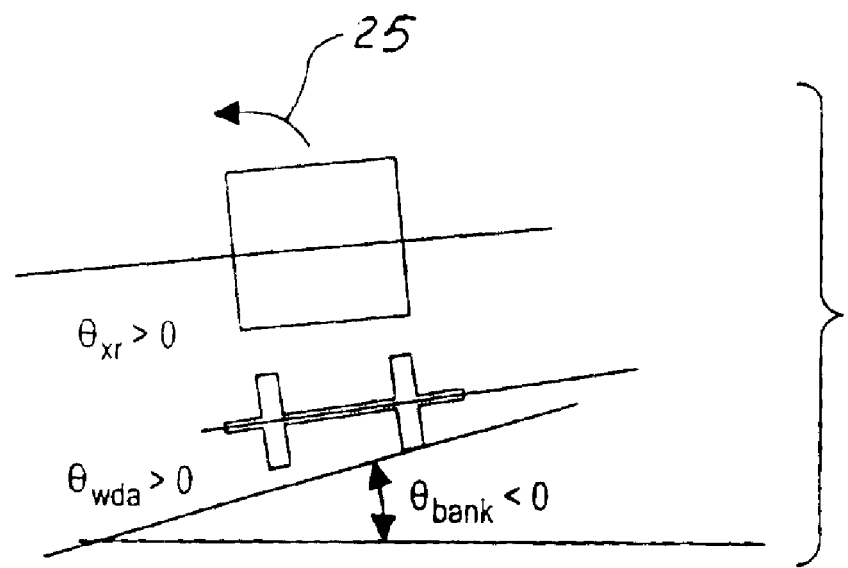
FIG. 3C is an end view of a vehicle in an on-camber convergent condition.

Referring now to FIG. 3C, a bank angle of less than 0, a wheel departure angle greater than 0, and a relative roll angle greater than 0 is shown with a roll moment 25 acting to the left. Thus, the vehicle is in an on-camber convergent state. That is, the convergent state refers to the vehicle tending towards not overturning.

Figure 3D:
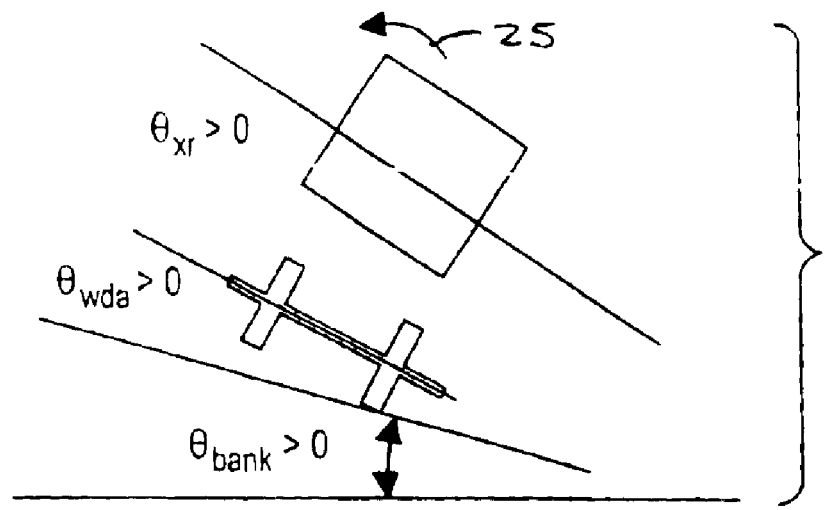
FIG. 3D is an end view of a vehicle in an off-camber convergent condition.

Referring now to FIG. 3D, when the bank angle is greater than 0, the wheel departure angle is greater than 0, and the relative roll angle is greater than 0 and the roll moment is tending to the left, the vehicle is in an off-camber convergent state. That is, the vehicle is tending toward not rolling over.

Figure 4A:
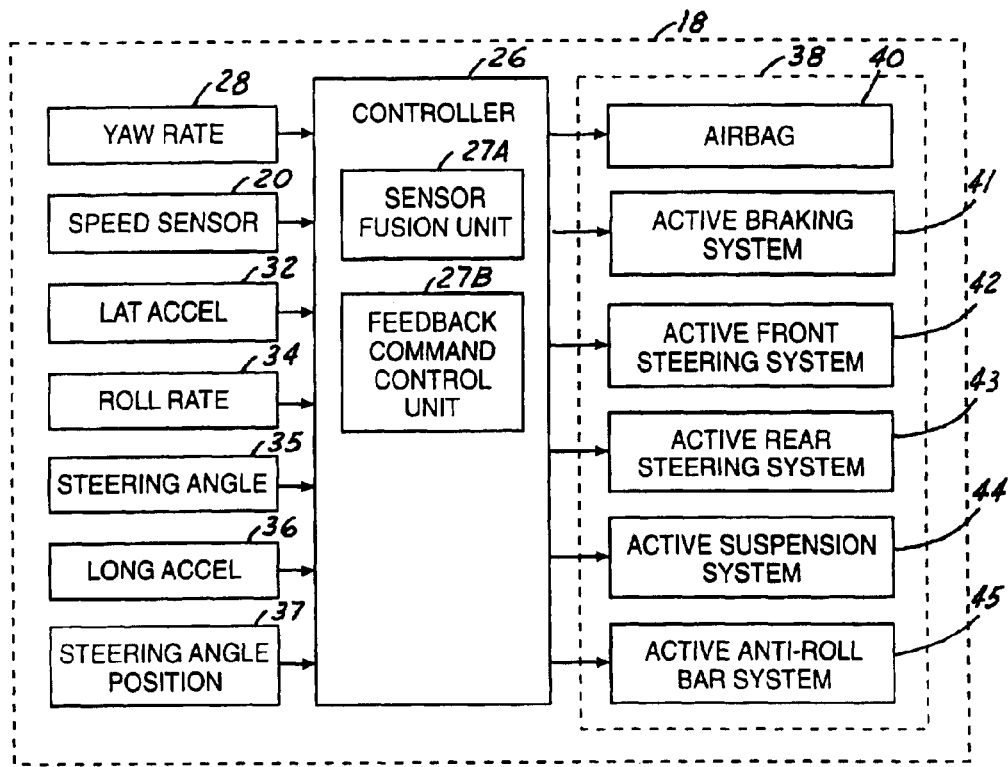
FIG. 4A is a block diagram of a stability control system.

Referring now to FIG. 4A, one embodiment of a roll stability control system 18 is illustrated in further detail having a controller 26 used for receiving information from a number of sensors which may include a yaw rate sensor 28, a speed sensor 20, a lateral acceleration sensor 32, a roll rate sensor 34, a steering angle sensor (hand wheel position) 35, a longitudinal acceleration sensor 36, and steering angle position sensor 37.

In one embodiment, the sensors are located at the center of gravity of the vehicle. Those skilled in the art will recognize that the sensors may also be located off the center of gravity and translated equivalently thereto.

Lateral acceleration, roll orientation and speed may be obtained using a global positioning system (GPS). Based upon inputs from the sensors, controller 26 may control a safety device 38. Depending on the desired sensitivity of the system and various other factors, not all the sensors 20, 28, 32, 34, 35, 36, and 37, or various combinations of the sensors, may be used in a commercial embodiment. Safety device 38 may control an airbag 40, an active braking system 41, an active front steering system 42, an active rear steering system 43, an active suspension system 44, and an active anti-roll bar system 45, or combinations thereof. Each of the systems 40–45 may have their own controllers for activating each one. As mentioned above, the safety system 38 may be at least the active braking system 41.

Roll rate sensor 34 may sense the roll condition of the vehicle based on sensing the height of one or more points on the vehicle relative to the road surface. Sensors that may be used to achieve this include a radar-based proximity sensor, a laser-based proximity sensor and a sonar-based proximity sensor.

Roll rate sensor 34 may also sense the roll condition based on sensing the linear or rotational relative displacement or displacement velocity of one or more of the suspension chassis components which may include a linear height or travel sensor, a rotary height or travel sensor, a wheel speed sensor used to look for a change in velocity, a steering wheel position sensor, a steering wheel velocity sensor and a driver heading command input from an electronic component that may include steer by wire using a hand wheel or joy stick.

The roll condition may also be sensed by sensing the force or torque associated with the loading condition of one or more suspension or chassis components including a pressure transducer in active air suspension, a shock absorber sensor such as a load cell, a strain gauge, the steering system absolute or relative motor load, the steering system pressure of the hydraulic lines, a tire lateral force sensor or sensors, a longitudinal tire force sensor, a vertical tire force sensor or a tire sidewall torsion sensor.

The roll condition of the vehicle may also be established by one or more of the following translational or rotational positions, velocities or accelerations of the vehicle including a roll gyro, the roll rate sensor 34, the yaw rate sensor 28, the lateral acceleration sensor 32, a vertical acceleration sensor, a vehicle longitudinal acceleration sensor, lateral or vertical speed sensor including a wheel-based speed sensor, a radar-based speed sensor, a sonar-based speed sensor, a laser-based speed sensor or an optical-based speed sensor.

Based on the inputs from sensors 20, 28, 32, 34, 35, 36, 37, controller 26 determines a roll condition and controls any one or more of the safety devices 40–45.

Speed sensor 20 may be one of a variety of speed sensors known to those skilled in the art. For example, a suitable speed sensor 20 may include a sensor at every wheel that is averaged by controller 26. The controller 26 translates the wheel speeds into the speed of the vehicle. Yaw rate, steering angle, wheel speed and possibly a slip angle estimate at each wheel may be translated back to the speed of the vehicle at the center of gravity. Various other algorithms are known to those skilled in the art. For example, if speed is determined while speeding up or braking around a corner, the lowest or highest wheel speed may not be used because of its error. Also, a transmission sensor may be used to determine vehicle speed.

Figure 4B:
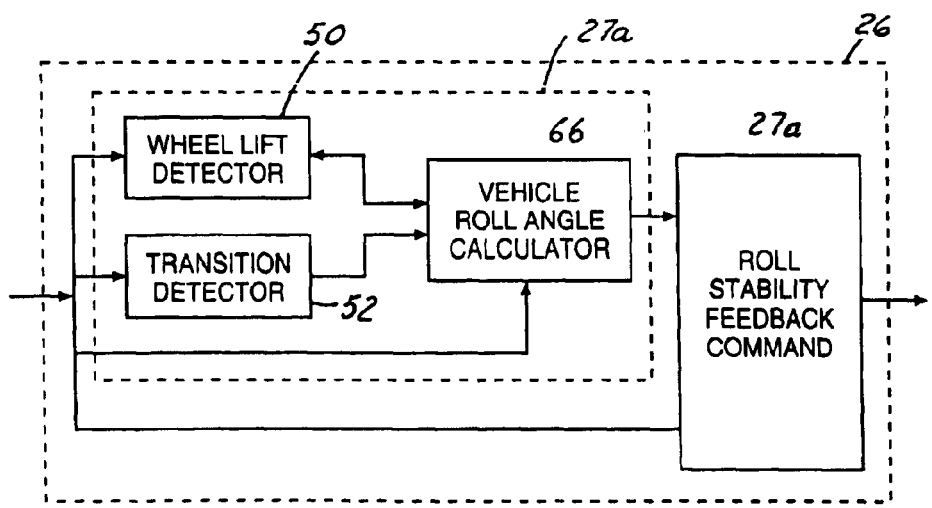
FIG. 4B is a block diagram of the controller 26 used in the stability control system depicted in FIG. 4A.

Referring now to FIGS. 4A and 4B, controller 26 is illustrated in further detail. There are two major functions in controller 26: the rollover trend determination, which is called a sensor fusion unit, 27A and the feedback control command unit 27B. The sensor fusion unit 27A can be further decomposed as a wheel lift detector 50, a transition detector 52 and a vehicle roll angle calculator 66.

Figure 5:
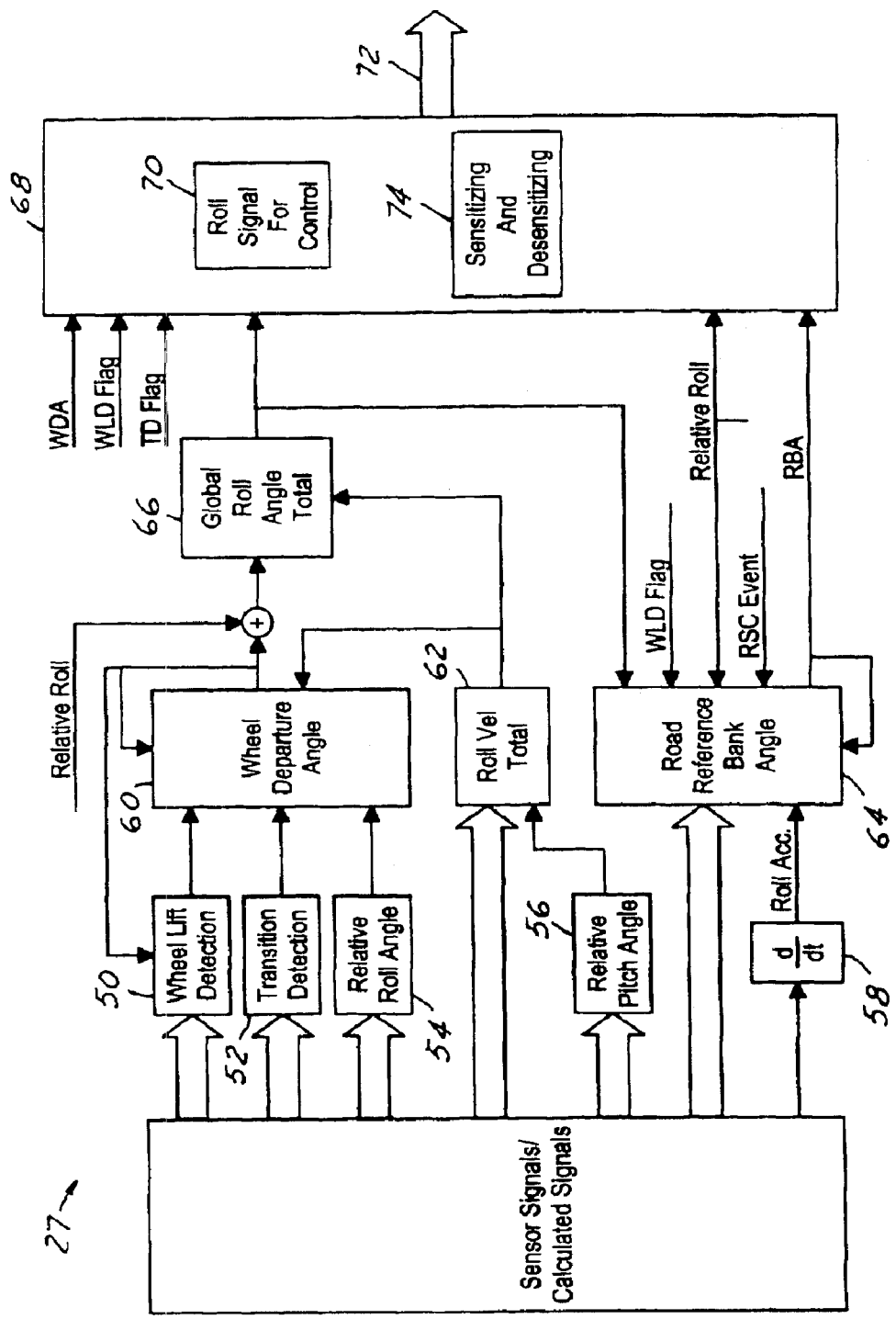
FIG. 5 is a block diagrammatic view of the unit 27 depicted in FIG. 4B, which is used for quantitatively and qualitatively determining rollover trend of a vehicle.

Referring now to FIG. 5, the sensor fusion unit 27A is illustrated in further detail. The sensor fusion unit 27A receives the various sensor signals, 20, 28, 32, 34, 35, 36, 37 and integrates all the sensor signals with the calculated signals to generate signals suitable for roll stability control algorithms. From the various sensor signals wheel lift detection may be determined by the wheel lift detector 50. Wheel lift detector 50 includes both active wheel lift detection and active wheel lift detection, and wheel grounding condition detection. Wheel lift detector is described in co-pending U.S. provisional application Ser. No. 60/400,375 filed Aug. 1, 2002, which is incorporated by reference herein. The modules described below may be implemented in hardware or software in a general purpose computer (microprocessor). From the wheel lift detection module 50, a determination of whether each wheel is absolutely grounded, possibly grounded, possibly lifted, or absolutely lifted may be determined. Transition detection module 52 is used to detect whether the vehicle is experiencing aggressive maneuver due to sudden steering wheel inputs from the driver. The sensors may also be used to determine a relative roll angle in relative roll angle module 54. Relative roll angle may be determined in many ways. One way is to use the roll acceleration module 58 in conjunction with the lateral acceleration sensor. As described above, the relative roll angle may be determined from the roll conditions described above.

The various sensor signals may also be used to determine a relative pitch angle in relative pitch angle module 56 and a roll acceleration in roll acceleration module 58. The outputs of the wheel lift detection module 50, the transition detection module 52, and the relative roll angle module 54 are used to determine a wheel departure angle in wheel departure angle module 60. Various sensor signals and the relative pitch angle in relative pitch angle module 56 are used to determine a relative velocity total in module 62. The road reference bank angle block 64 determines the bank angle. The relative pitch angle, the roll acceleration, and various other sensor signals as described below are used to determine the road reference bank angle. Other inputs may include a roll stability control event (RSC) and/or the presence of a recent yaw stability control event, and the wheel lifting and/or grounding flags.

The global roll angle of the vehicle is determined in global roll angle module 66. The relative roll angle, the wheel departure angle, and the roll velocity total blocks are all inputs to the global roll angle total module 66. The global roll angle total block determines the global roll angle $\theta_x$. An output module 68 receives the global roll angle total module 66 and the road reference bank angle from the road reference bank angle module 64. A roll signal for control is developed in roll signal module 70. The roll signal for control is illustrated as arrow 72. A sensitizing and desensitizing module 74 may also be included in the output module 68 to adjust the roll signal for control.

In the reference road bank angle module 64, the reference bank angle estimate is calculated. The objective of the reference bank estimate is to track a robust but rough indication of the road bank angle experienced during driving in both stable and highly dynamic situations, and which is in favor for roll stability control. That is, this reference bank angle is adjusted based on the vehicle driving condition and the vehicle roll condition. Most importantly, when compared to the global roll estimate, it is intended to capture the occurrence and physical magnitude of a divergent roll condition (two wheel lift) should it occur. This signal is intended to be used as a comparator against the global roll estimate for calculating the error signal which is fed back to roll stability controller 26.

Referring now to FIG. 6, the following is a list of constants that are set in step 80.

STATIC_ROLL_BOUNDARY: Generally, this parameter will be vehicle specific. In the present example 6 degrees is used. The steady state roll angle at the onset of two-wheel lift in a quasi-steady state turn. The initial value should be chosen to correspond to the loading condition and vehicle configuration that provides the highest level of lateral acceleration at the onset of two-wheel lift in a quasi-steady turn. All design loading conditions and vehicle configurations for which a specific calibration is to be used should be considered.

DYNAMIC_ROLL_BOUNDARY: Generally, this parameter will also be vehicle specific. In the present example 3 degrees is used. The steady state roll angle associated with the lowest lateral acceleration which could result in two wheel lift. The initial value should be chosen based on the loading condition and vehicle configuration which results in the lowest lateral acceleration which could result in two wheel lift over all variations of road disturbances and dynamic input. All design loading conditions and vehicle configurations should be considered for which a specific calibration is to be used.

MAX_RAMP_RATE: The maximum rate at which the reference bank estimate is adjusted toward the global roll estimate in the transitional roll region. In the present example, 5 deg/sec is used.

MIN_RAMP_RATE: The minimum rate at which the reference bank estimate is adjusted toward the global roll estimate in the transitional roll region. In the present example, 0 deg/sec is used.

ON_CAMBER_TURN_STABLE_RAMP_RATE: The rate at which the reference bank estimate is adjusted toward the global roll estimate in the transitional region when the vehicle is in an on-camber turn and considered to have a non-divergent stability tendency. In the present example 20 deg/sec is used.

FRONT_NOMINAL_ROLL_AT_LIFT: Roll angle magnitude at a front wheel corresponding to the onset of wheel lift when no relative pitch is present. In the present example, 5.8 deg is used.

FRONT_LIFT_PITCH_GAIN: In the present example, 1.0 deg/deg s used. The influence of relative pitch on the onset of wheel lift at the front of the vehicle.

REAR_NOMINAL_ROLL_AT_LIFT: In the present example, 5.4 deg s used, roll angle magnitude at a rear wheel corresponding to the onset of wheel lift when no relative pitch is present.

REAR_LIFT_PITCH_GAIN: In the present example, 0.76 deg/deg s used, the influence of relative pitch on the onset of wheel lift at the rear of the vehicle.

Local variables with values from external inputs are determined/calculated from the various sensor inputs in step 82. The local variables are initialized as follows with units in parentheses:

Lateral Acceleration=FLT_LAT_ACC (m/s/s)
YRComp=FLT_YAW_RATE (deg/s)=compensated or filtered yaw rate
GlobalPitchUncertainty=PITCH_UNCERTAINTY (deg)
RecentRSCEvent=RECENT_ROLL_CNTRL_EVENT (Boolean)
RecentYSCEvent=TBD (Boolean)=recent yaw stability control event
RelativePitchEst=REL_PITCH_ANGLE estimated (deg)
RelativeRollEst=REL_ROLL_ANGLE estimated(deg)
RollAcceleration=ROLL_ACCELERATION (deg/s/s)
GlobalRollEst=ROLL_ANGLE_TOTAL (deg)
LateralAccelerationZ1=Z1_FLT_LAT_ACC (m/s/s)=A or the previous Lateral acceleration Flags to indicate if the lateral acceleration is increasing or decreasing as compared to a previous lateral acceleration are determined in step 84. In code, that is

```
If(LateralAcceleration (Ay) > LateralAccelerationZ1)
{
LateralAccelerationIncreasing = TRUE;
LateralAccelerationDecreasing = FALSE;
}
Else if(LateralAcceleration < LateralAccelerationZ1)
{
LateralAccelerationIncreasing = FALSE;
LateralAccelerationDecreasing = TRUE;
}
```

A deadband for the reference bank angle estimate based on the uncertainty in the rate of change of the global roll angle due to pitch angle uncertainty is calculated in step 86. This variable is in terms of a rate of change.

PitchUncertaintyRRDB=ABS(YRComp*sin(GlobalPitchUncertainty))

The Linear Road Bank Angle Estimate is calculated in step 88. This estimate assumes a perfect global roll estimate. It also assumes the difference between the road bank angle and the global roll angle $\theta_x$ is accurately modeled by relative roll angle. Two-wheel lift is intentionally assumed to not be present at this point.

LinearBankAngle=GlobalRollEst $\theta_x$–RelativeRollEst $\theta_{xr}$.

The linear bank angle may also be thought of as the sum of the bank angle and the wheel departure angle.

The reference bank angle is a state variable whose value is assumed to be preserved from the previous loop. The global roll estimate, the relative roll estimate, and the wheel lift status flags have significant influence on the adjustment of the road bank estimate on a loop by loop basis. The relative roll angle is determined in step 90.

The fundamental premise for calculating the reference bank angle is determining which or three roll regions the vehicle is instantaneously operating within. Consider the case where the global roll motion suggests a divergence with excessive positive roll, or excessive lean to the right.

In this case, Linear Roll Region, if the relative roll angle is less than a lower threshold in step 92, step 94 is executed. In step 94, the DYNAMIC_ROLL_BOUNDARY, the vehicle is assumed to be in the linear roll region. In this region, the relative roll or linear suspension roll estimate is assumed to accurately represent the difference between global roll angle estimate (i.e. no wheel lift) and the road bank angle. That is, the reference road bank angle is set to the linear bank angle in step 96.

Transitional Roll Region: In step 92, if the relative roll angle is greater than the DYNAMIC_ROLL_BOUNDARY yet less than an upper threshold, the STATIC_ROLL_BOUNDARY, the vehicle is assumed to be in the transitional roll region. This region, the relative roll or linear suspension roll estimate can no longer be assumed to accurately represent the difference between global roll angle estimate (i.e. no wheel lift) and the road bank angle. In this case, two criteria must be evaluated to establish how the reference bank estimate will be updated. That is, if the vehicle has divergent tendency or state and if the vehicle is in an on-camber turn.

Divergent Stability Tendency: The first criteria is whether the vehicle has a divergent tendency from a stability point of view in step 98.

If the lateral acceleration is increasing a divergent tendency is assumed. In some cases the lateral acceleration does not increase any further once two-wheel lift has occurred and may actually be decreasing during and after the onset of two-wheel lift.

Due to the impact of two-wheel lift on center of gravity height and therefore overturning moment, a divergent roll acceleration is associated with two-wheel lift. As a result, a divergent tendency is assumed if a positive roll acceleration present.

If the vehicle was recently in a yaw control event, a divergent tendency is assumed. If the vehicle was recently in a roll control event, a divergent tendency is assumed. If the vehicle has a roll acceleration greater than 0 (or another threshold), a divergent tendency state is also assumed. Thus, if any of the four conditions above are met, the vehicle has a divergent tendency.

On-Camber Turn: The second criteria is whether or not the vehicle is in an on-camber or off camber turn in step 100. On/off camber refers to sign of the road bank angle relative to the turning direction. The direction of the turn is based on the relative roll angle. When the relative roll angle and linear bank angle have opposing signs, the vehicle is assumed to be in an on-camber turn. For example, in a steady state left hand turn, the relative roll angle will be positive. If the linear roll angle is negative, which would be the case if the lateral slope of the road is downward going from right to left, the vehicle is assumed to be in an on-camber turn.

A driving lane on public roads tend to be in the neutral to 12 deg on-camber range. Public roads tend to be in the +−3 deg range while driving on straight sections of road, traversing lanes or turning through intersections. On-camber positions are illustrated in FIGS. 3A and 3C above.

Off-Camber Attitude: If the vehicle is determined to be in an off-camber attitude relative to the global reference frame, the benefit of doubt is given to the presence of wheel lift when divergent changes in the global roll attitude of the vehicle is observed. If a divergent stability tendency is calculated and the global roll angle is increasing, the roll motion is assumed to be due to wheel lift and the reference bank angle is held constant. If a divergent tendency is NOT calculated, the reference bank estimate is ramped towards the linear roll angle. The ramp rate for the reference bank estimate is determined by linear interpolation between a higher value, MAX_RAMP_RATE, when the relative roll angle is at the DYNAMIC_ROLL_BOUNDARY and a lower value, MIN_RAMP_RATE, when the relative roll angle is at the STATIC_ROLL_BOUNDARY. If as a result of adjusting the reference bank estimate, the reference bank estimate exceeds the linear roll angle, it is assigned the value of the linear roll angle.

On-Camber Attitude: If the vehicle is determined to be in an on-camber attitude relative to the global reference frame, the benefit of doubt is given to a stable roll condition. If a divergent stability tendency is observed, the reference bank estimate is ramped towards the linear roll angle. The ramp rate for the reference bank estimate is determined by linear interpolation between a higher value, MAX_RAMP_RATE, when the relative roll angle is at the DYNAMIC_ROLL_BOUNDARY and a lower value, MIN_RAMP_RATE, when the relative roll angle is at the STATIC_ROLL_BOUNDARY. If a divergent stability tendency is not observed, two-wheel lift is assumed not to be present and the reference bank estimate is ramped to the linear roll estimate at a fast rate: ON_CAMBER_TURN_STABLE_RAMP_RATE. If as a result of adjusting the reference bank estimate, the reference bank estimate exceeds that value which would be computed in the linear roll region, the its value is adjusted to that value which would result in the linear roll region.

Thus, based on the above criteria, a new reference road bank angle is determined in step 102.

Divergent Roll Region: In step 92, if the relative roll angle is greater than the STATIC_ROLL_BOUNDARY, the vehicle is assumed to be in the divergent roll region in step 103. In this region, any changes in the global roll estimate are assumed to be the result of wheel lift or divergent roll motion. As a result the reference bank angle is held constant.

The following depicts the logic for an embodiment of the above case:

Global roll motion suggests a divergence with excessive positive (leaning right) body roll:

```
if(LinearBankAngle > RefBankAngle)
{
    Linear Roll Region:
    if(RelativeRollEst <= DYNAMIC_ROLL_BOUNDARY)
        RefBankAngle = LinearBankAngle;
    Transitional Roll Region:
    else if(RelativeRollEst <= STATIC_ROLL_BOUNDARY)
    {
    DivergentTendency=(LateralAccelerationIncreasing
                || RollAcceleration>0.0
                || RecentYSCEvent
                || RecentRSCEvent);
    OnCamberTurn = (LinearBankAngle < 0.0);
    if((OnCamberTurn && DivergentTendency)||(!OnCamberTurn &&
            !DivergentTendency))
        {
        temp=MaxRampRate*(STATIC_ROLL_BOUNDARY-RelativeRollEst)
          /(STATIC_ROLL_BOUNDARY-DYNAMIC_ROLL_BOUNDARY);
        temp=MAX(temp,PitchUncertaintyRRDB);
        RefBankAngle += LOOP_TIME*temp;
        RefBankAngle=MIN(LinearBankAngle,RefBankAngle);
        }
    else if(OnCamberTurn && !DivergentTendency)
        {
        RefBankAngle+=LOOP_TIME*ON_CAMBER_TURN_STABLE_RAMP_RATE;
        RefBankAngle = MIN(LinearBankAngle,RefBankAngle);
        }
    }
    Divergent Roll Region:
    Hold Reference Bank Angle Estimate Constant
}
```

In the case where the global roll motion suggests a divergence with excessive negative roll, or excessive lean to the left, similar logic is applied, and the associated changes in signal signs are accounted for to ensure symmetric reference bank angle estimation.

Global roll motion suggests a divergence with excessive negative (leaning left) body roll:

```
if(LinearBankAngle < RefBankAngle)
    {
    Linear Roll Region:
    if(RelativeRollEst>= -DYNAMIC_ROLL_BOUNDARY)
    RefBankAngle=
        LinearBankAngle;
    Transitional Roll Region:
    else if(RelativeRollEst >= -STATIC_ROLL_BOUNDARY)
    {
        DivergentTendency=(LateralAccelerationDecreasing
                || RollAcceleration<0.0
                || RecentYSCEvent
                || RecentRSCEvent);
        OnCamberTurn = (LinearBankAngle > 0.0);
        if((OnCamberTurn &&
        DivergentTendency)||(!OnCamberTurn &&
            !DivergentTendency))
        {
        temp=MaxRampRate*(STATIC_ROLL_
        BOUNDARY+RelativeRollEst)
          /(STATIC_ROLL_BOUNDARY - DYNAMIC_
          ROLL_BOUNDARY);
        temp = MAX(temp,PitchUncertaintyRRDB);
```

```
            RefBankAngle += LOOP_TIME*temp;
            RefBankAngle = MAX(LinearBankAngle,RefBankAngle);
            }
        else if(OnCamberTurn && !DivergentTendency)
            {
            RefBankAngle-=LOOP_TIME*ON
                _CAMBER_TURN_STABLE_RAMP_RATE;
            RefBankAngle = MAX(LinearBankAngle,RefBankAngle);
            }
        }
    Divergent Roll Region:
    Hold Reference Bank Angle Estimate Constant
    }
```

Next, upper and lower bounds are placed on the Reference Bank Estimate in step 104. These bounds are based on the wheel lift detection absolutely lifted and absolutely grounded status flags calculated for each corner of the vehicle. This logic provides a mechanism for the Reference Bank Angle to synchronize with the actual road bank angle as the individual tires depart and re-establish contact with the road surface. First, the roll angle associated with wheel lift at each corner must be estimated. The relationship is assumed to be a function of relative pitch angle:

RollAtFLLift=FRONT_NOMINAL_ROLL_AT_LIFT+FRONT_LIFT_PITCH_GAIN*RelativePitchEst;
RollAtFRLift=-FRONT_NOMINAL_ROLL_AT_LIFT-FRONT_LIFT_PITCH_GAIN*RelativePitchEst;
RollAtRLLift=REAR_NOMINAL_ROLL_AT_LIFT-REAR_LIFT_PITCH_GAIN*RelativePitchEst;
RollAtRRLift=-REAR_NOMINAL_ROLL_AT_LIFT+REAR_LIFT_PITCH_GAIN*RelativePitchEst;

In step 106, the wheel lift flags are obtained for each wheel. If a comparison of the reference bank estimate and global roll estimate indicates a non-divergent roll condition at a given corner of the vehicle yet a divergent condition is indicated by the wheel not lifted flag at that corner, the reference bank estimate is adjusted by the least amount which results in a divergent condition at that corner of the vehicle in step 108. This logic is applied at each corner of the vehicle.

```
    if(Lift_Flags_Status(FL)==LIFT_AL_STATUS)
        RefBankAngle=MIN(GlobalRollEst-RollAtFLLift,
            RefBankAngle);
    if(Lift_Flags_Status(FR)==LIFT_AL_STATUS)
        RefBankAngle=MAX(GlobalRollEst-RollAtFRLift,
            RefBankAngle);
    if(Lift_Flags_Status(RL)==LIFT_AL_STATUS)
        RefBankAngle=MIN(GlobalRollEst-RollAtRLLift,
            RefBankAngle);
    if(Lift_Flags_Status(RR)==LIFT_AL_STATUS)
        RefBankAngle=MAX(GlobalRollEst-RollAtRRLift,
            RefBankAngle);
```

If a comparison of the reference bank estimate and global roll estimate indicates a divergent roll condition at a given corner of the vehicle yet a non-divergent condition is indicated by the wheel not lifted flag at that corner, the reference bank estimate is adjusted by the least amount which results in a non-divergent condition at that corner of the vehicle. This logic is applied at each corner of the vehicle.

```
    if(Lift_Flags_Status(FL)==LIFT_AG_STATUS)
        RefBankAngle=MAX(GlobalRollEst-RollAtFLLift,
            RefBankAngle);
    if(Lift_Flags_Status(FR)==LIFT_AG_STATUS)
        RefBankAngle=MIN(GlobalRollEst-RollAtFRLift,
            RefBankAngle);
    if(Lift_Flags_Status(RL)==LIFT_AG_STATUS)
        RefBankAngle=MAX(GlobalRollEst-RollAtRLLift,
            RefBankAngle);
    if(Lift_Flags_Status(RR)==LIFT_AG_STATUS)
        RefBankAngle=MIN(GlobalRollEst-RollAtRRLift,
            RefBankAngle);
```

If the interested wheels are absolutely grounded then the reference bank angle can be adjusted to converge. The factor 1.1 is chosen to allow the reference bank angle to converge to the linear bank angle. This is encompassed by step 108.

```
    if (FINAL_WHEEL_LIFT_STATUS[0]==
        ABSOLUTELY_GROUNDED) REFBANKANGLE=
        LinearBankAngle+(REFBANKANGLE-
        LinearBankAngle)/1.1;
    if (FINAL_WHEEL_LIFT_STATUS[1]==
        ABSOLUTELY_GROUNDED) REFBANKANGLE=
        LinearBankAngle+(REFBANKANGLE-
        LinearBankAngle)/1.1;
    if (FINAL_WHEEL_LIFT_STATUS[2]==
        ABSOLUTELY_GROUNDED) REFBANKANGLE=
        LinearBankAngle+(REFBANKANGLE-
        LinearBankAngle)/1.1;
    if (FINAL_WHEEL_LIFT_STATUS[3]==
        ABSOLUTELY_GROUNDED) REFBANKANGLE=
        LinearBankAngle+(REFBANKANGLE-
        LinearBankAngle)/1.1;
```

The wheel departure angle may be brought to correct reference bank in step 110. This is performed using the steps below.

```
B2R_ROLL=(REL_ROLL_ANGLE*1.1+ss_deg_WHEEL_DEPARTURE_ANGLE;
if (REL_ROLL_ANGLE>=0)
{
#if (CSW_PARAM_ADJUST_CFG)
    if ((REL_ROLL_ANGLE>=(Rsc_dummy07*p_ROLL_TH_05)
        && (FINAL_WHEEL_LIFT_STATUS[0]!=ABSOLUTELY_GROUNDED
            || FINAL_WHEEL_LIFT_STATUS[2]!=ABSOLUTELY_GROUNDED))
        || PRECHARGE_RIGHT_TO_LEFT_TRANSITION==1
        || FINAL_WHEEL_LIFT_STATUS[0]==ABSOLUTELY_LIFTED
        || FINAL_WHEEL_LIFT_STATUS[2]==ABSOLUTELY_LIFTED
    )
#else
    if ( (REL_ROLL_ANGLE>= p_ROLL_TH_80
        && (FINAL_WHEEL_LIFT_STATUS[0]!=ABSOLUTELY_GROUNDED
```

```
            ||FINAL_WHEEL_LIFT_STATUS[2]!=ABSOLUTELY_GROUNDED))
        || PRECHARGE_RIGHT_TO_LEFT_TRANSITION==1
        || FINAL_WHEEL_LIFT_STATUS[0]==ABSOLUTELY_LIFTED
        || FINAL_WHEEL_LIFT_STATUS[2] == ABSOLUTELY_LIFTED
        )
#endif
    REFBANKANGLE=min( (ROLL_ANGLE_TOTAL-STDST_ROLL_CAPTURE),
        REFBANKANGLE);
    if (FINAL_WHEEL_LIFT_STATUS[0]==ABSOLUTELY_LIFTED
            && FINAL_WHEEL_LIFT_STATUS[2]==ABSOLUTELY_LIFTED)
        REFBANKANGLE=min( (ROLL_ANGLE_TOTAL-B2R_ROLL),REFBANKANGLE);
}
if (REL_ROLL_ANGLE<0)
{
#if (CSW_PARAM_ADJUST_CFG)
    if ( (REL_ROLL_ANGLE<-(Rsc_dummy07*p_ROLL_TH_05)
            && (FINAL_WHEEL_LIFT_STATUS[1]!=ABSOLUTELY_GROUNDED
            ||FINAL_WHEEL_LIFT_STATUS[3]!=ABSOLUTELY_GROUNDED))
        ||union_PRECHARGE_FLAGS.st_PRECHARGE.bf_bool_LEFT_TO_RIGHT_
            TRANSITION==1
        ||FINAL_WHEEL_LIFT_STATUS[1]==ABSOLUTELY_LIFTED
        ||FINAL_WHEEL_LIFT_STATUS[3]==ABSOLUTELY_LIFTED
        )
#else
    if ( (REL_ROLL_ANGLE<-p_ROLL_TH_80
            && (FINAL_WHEEL_LIFT_STATUS[1]!=ABSOLUTELY_GROUNDED
            || FINAL_WHEEL_LIFT_STATUS[3]!=ABSOLUTELY_GROUNDED))
        || PRECHARGE_LEFT_TO_RIGHT_TRANSITION==1
        || FINAL_WHEEL_LIFT_STATUS[1]==ABSOLUTELY_LIFTED
        || FINAL_WHEEL_LIFT_STATUS[3]==ABSOLUTELY_LIFTED
        )
#endif
    REFBANKANGLE=max( (ROLL_ANGLE_TOTAL-STDST_ROLL_CAPTURE),
        REFBANKANGLE);
    if (FINAL_WHEEL_LIFT_STATUS[1]==ABSOLUTELY_LIFTED
            && FINAL_WHEEL_LIFT_STATUS[3]==ABSOLUTELY_LIFTED)
        REFBANKANGLE = max( (ROLL_ANGLE_TOTAL-B2R_ROLL),REFBANKANGLE);
}
```

If the one or two wheels are possibly grounded or possibly lifted the following reference bank computation will be conducted as part of the reference bank angle adjustment in step 108.

```
if( REL_ROLL_ANGLE > 0 )
    {
        if (GET_LIFT_PG_STATE(FL)
        && GET_LIFT_PG_STATE(RL) )
        {
            if(LinearBankAngle > REFBANKANGLE)
                REFBANKANGLE +=
                    RATE_OF_CHANGE_2;
            else if (LinearBankAngle<REFBANKANGLE)
                REFBANKANGLE -=
                    RATE_OF_CHANGE_2;
        }
        if ((GET_LIFT_PL_STATE(FL)
        && !(GET_LIFT_FL_STATE(RL) ))
            || (!( GET_LIFT_
            PL_STATE(FL) ) && GET_LIFT_FL_STATE(RL) ))
        {
            if (LinearBankAngle<REFBANKANGLE)
                REFBANKANGLE += RATE_OF_CHANGE;
            else if (LinearBankAngle>REFBANKANGLE)
                REFBANKANGLE -= RATE_OF_CHANGE;
        }
        if (GET_LIFT_PL_STATE(FL)
        && GET_LIFT_PL_STATE(RL) )
        {
            if (LinearBankAngle<REFBANKANGLE)
                REFBANKANGLE +=RATE_OF_CHANGE_2;
            else if (LinearBankAngle>REFBANKANGLE)
                REFBANKANGLE -= RATE_OF_CHANGE_2;
        }
    }
if (REL_ROLL_ANGLE < 0 )
{
    if (GET_LIFT_PG_STATE(FR)
    && GET_LIFT_PG_STATE(RR) )
    {
        if (LinearBankAngle>REFBANKANGLE)
            REFBANKANGLE += RATE_OF_CHANGE_2;
        else if (LinearBankAngle<REFBANKANGLE)
            REFBANKANGLE -= RATE_OF_CHANGE_2;
    }
    if ((GET_LIFT_PL_STATE(FR)
    && GET_LIFT_PG_STATE(RR) )
        ||(GET_LIFT_PG_STATE(FR)
        && GET_LIFT_PL_STATE(RR) ))
    {
        if (LinearBankAngle<REFBANKANGLE)
            REFBANKANGLE += RATE_OF_CHANGE;
        else if (LinearBankAngle>REFBANKANGLE)
            REFBANKANGLE -= RATE_OF_CHANGE;
    }
    if ( GET_LIFT_PL_STATE(FR)
    && GET_LIFT_PL_STATE(RR) )
    {
        if (LinearBankAngle<REFBANKANGLE)
            REFBANKANGLE += RATE_OF_CHANGE_2;
        else if (LinearBankAngle>REFBANKANGLE)
            REFBANKANGLE -= RATE_OF_CHANGE_2;
    }
}
if (REL_ROLL_ANGLE > 0 )
{
    if (GET_LIFT_PG_STATE(FL) )
```

```
{
        if (LinearBankAngle>REFBANKANGLE)
                REFBANKANGLE += RATE_OF_CHANGE;
        else if (LinearBankAngle<REFBANKANGLE)
                REFBANKANGLE -= RATE_OF_CHANGE;
}
if (GET_LIFT_PG_STATE(RL) )
{
        if (LinearBankAngle>REFBANKANGLE)
                REFBANKANGLE += RATE_OF_CHANGE;
        else if (LinearBankAngle<REFBANKANGLE)
                REFBANKANGLE -= RATE_OF_CHANGE;
}
if (GET_LIFT_PL_STATE(FL) )
{
        if (LinearBankAngle<REFBANKANGLE)
                REFBANKANGLE += RATE_OF_CHANGE;
        else if (LinearBankAngle>REFBANKANGLE)
                REFBANKANGLE -= RATE_OF_CHANGE;
}
if (GET_LIFT_PL_STATE(RL) )
{
        if (LinearBankAngle<REFBANKANGLE)
                REFBANKANGLE += RATE_OF_CHANGE;
        else if (LinearBankAngle>REFBANKANGLE)
                REFBANKANGLE -= RATE_OF_CHANGE;
}
if ((GET_LIFT_PL_STATE(FL)
&& GET_LIFT_PG_STATE(RL) )
        ||(GET_LIFT_PG_STATE(FL)
        && GET_LIFT_PL_STATE(RL) ))
{
        if (LinearBankAngle<REFBANKANGLE)
                REFBANKANGLE += RATE_OF_CHANGE;
        else if (LinearBankAngle>REFBANKANGLE)
                REFBANKANGLE -= RATE_OF_CHANGE;
}
}
else if (REL_ROLL_ANGLE < 0)
{
        if (GET_LIFT_PG_STATE(FR) )
        {
                if (LinearBankAngle>REFBANKANGLE)
                        REFBANKANGLE += RATE_OF_CHANGE;
                else if (LinearBankAngle<REFBANKANGLE)
                        REFBANKANGLE -= RATE_OF_CHANGE;
        }
        if (GET_LIFT_PG_STATE(RR) )
        {
                if (LinearBankAngle>REFBANKANGLE)
                        REFBANKANGLE += RATE_OF_CHANGE;
                else if (LinearBankAngle<REFBANKANGLE)
                        REFBANKANGLE -= RATE_OF_CHANGE;
        }
        if (GET_LIFT_PL_STATE(FR) )
        {
                if (LinearBankAngle<REFBANKANGLE)
                        REFBANKANGLE += RATE_OF_CHANGE;
                else if (LinearBankAngle>REFBANKANGLE)
                        REFBANKANGLE -= RATE_OF_CHANGE;
        }
        if (GET_LIFT_PL_STATE(RR) )
        {
                if (LinearBankAngle<REFBANKANGLE)
                        REFBANKANGLE += RATE_OF_CHANGE;
                else if (LinearBankAngle>REFBANKANGLE)
                        REFBANKANGLE -= RATE_OF_CHANGE);
        }
        if ((GET_LIFT_PL_STATE(FR)
        && GET_LIFT_PG_STATE(RR) )
                ||(GET_LIFT_PG_STATE(FR)
                && GET_LIFT_PL_STATE(RR) ))
        {
                if (LinearBankAngle<REFBANKANGLE)
                        REFBANKANGLE += RATE_OF_CHANGE;
                else if (LinearBankAngle>REFBANKANGLE)
                        REFBANKANGLE -= RATE_OF_CHANGE;
        }
}
```

In response to the reference bank angle, a safety device within the vehicle may be controlled in step 112. In a roll control system, the reference bank angle may be one of the signals that is used to develop the roll signal for control as shown in module 70 above.

While particular embodiments of the invention have been shown and described, numerous variations and alternate embodiments will occur to those skilled in the art. Accordingly, it is intended that the invention be limited only in terms of the appended claims.

What is claimed is:

1. A control system for an automotive vehicle having a vehicle body comprising:
   a roll angle generator generating a relative roll angle signal;
   a plurality of sensors generating a plurality of sensor signals;
   a safety system; and
   a controller coupled to roll angle generator and the plurality of sensors, said controller generating a linear road bank angle, first reference bank angle and a relative roll angle in response to the roll angle generator and the plurality of sensor signals, said controller determining a first reference road bank angle and generating a second reference road bank angle in response to the linear road bank angle, the first reference road bank angle and a bank angle adjustment factor, said controller generating said bank angle adjustment factor as a function of the relative roll angle, said controller controlling the safety system in response to the second reference road bank angle estimate.

2. A control system as recited in claim 1 wherein the roll angle generator comprises a roll rate sensor.

3. A control system as recited in claim 1 wherein the safety device comprises one selected from the group consisting of an active brake control system, an active rear steering system, an active front steering system, an active anti-roll bar system, and an active suspension system.

4. A method for controlling an automotive vehicle comprising:
   determining a linear road bank angle;
   determining a first reference road bank angle;
   determining a bank angle adjustment factor as a function of a relative roll angle;
   generating a second reference road bank angle in response to the linear bank angle and the first reference road bank angle and the bank angle adjustment factor; and
   controlling a safety system in response to the second reference road bank angle.

5. A method as recited in claim 4 wherein the linear road bank angle is a difference between a global roll estimate and the relative roll angle.

6. A method as recited in claim 5 wherein the ramp rate is a function of a camber turn ramp rate.

7. A method as recited in claim 5 wherein the ramp rate is a function of a maximum ramp rate.

8. A method as recited in claim 4 wherein said bank angle adjustment factor is a function of a ramp rate.

9. A method as recited in claim 4 wherein the bank angle adjustment factor is a function of a static roll boundary.

10. A method as recited in claim 4 wherein the bank angle adjustment factor is a function of a dynamic roll boundary.

11. A method as recited in claim 4 wherein the bank angle adjustment factor is a function of a pitch uncertainty rate.

12. A method as recited in claim 4 wherein the bank angle adjustment factor is a function of a static roll boundary, dynamic roll boundary, the relative roll estimate, a loop time and a maximum ramp rate and a pitch uncertainty rate.

13. A method as recited in claim 4 further comprising measuring a pitch rate; and
adjusting the second reference road bank angle as a function of pitch rate.

14. A method as recited in claim 4 further comprising measuring a pitch rate; and
adjusting the second reference road bank angle as a function of pitch rate and a wheel lift status.

15. A method as recited in claim 4 further comprising measuring a pitch rate; and
adjusting the second reference road bank angle as a function of pitch rate, a wheel lift status and a convergent or non-convergent condition.

16. A method as recited in claim 4 further comprising adjusting the second reference road bank angle in response to an absolutely grounded condition.

17. A method as recited in claim 4 further comprising generating a wheel departure angle as a function of the second reference road bank angle and in response to an absolutely grounded condition.

18. A method as recited in claim 4 wherein the second reference road bank angle is determined as a function of roll acceleration.

19. A method as recited in claim 4 wherein the second reference road bank angle is determined as a function of lateral acceleration.

20. A method controlling an automotive vehicle comprising:
determining a linear road bank angle;
determining a first reference road bank angle;
determining whether the vehicle is operating in a linear roll region, a transitional roll region or a divergent roll region;
when the vehicle is operating in the linear roll region, generating a second reference road bank angle in response to a global roll and a linear bank angle adjustment factor;
determining a bank angle adjustment as a function of a relative roll angle;
when the vehicle is operating in the transitional roll region, generating the second reference road bank angle in response to the first reference bank angle and the bank angle adjustment factor;
when the vehicle is operating in the divergent region, holding constant the first reference road bank angle; and
controlling a safety system in response to the second reference road bank angle.

21. A method as recited in claim 20 wherein determining whether the vehicle is operating in a linear roll region, a transitional roll region or a divergent roll region is performed in response to a relative roll angle.

22. A method as recited in claim 20 wherein determining whether the vehicle is operating in a linear roll region, a transitional roll region or a divergent roll region comprises determining a roll angle; and
comparing the roll angle to a dynamic roll boundary and a static roll boundary.

23. A method as recited in claim 22 wherein when the roll angle is below the dynamic roll boundary, setting a region as a linear region.

24. A method as recited in claim 22 wherein when the roll angle is above the static roll boundary, setting a region as a divergent roll region.

25. A method as recited in claim 22 wherein when the roll angle is between the dynamic roll boundary and the static roll boundary, setting a region as a transitional roll region.

26. A method as recited in claim 20 wherein the linear road bank angle is a difference between a global roll estimate and a relative roll angle estimate.

27. A method as recited in claim 20 wherein said bank angle adjustment factor is a function of a ramp rate.

28. A method as recited in claim 27 wherein the ramp rate is a function of a camber turn ramp rate.

29. A method as recited in claim 27 wherein the ramp rate is a function of a maximum ramp rate.

30. A method as recited in claim 27 wherein the bank angle adjustment factor is a function of a static roll boundary.

31. A method as recited in claim 20 wherein the bank angle adjustment factor is a function of a dynamic roll boundary.

32. A method as recited in claim 20 wherein the bank angle adjustment factor is a function of a pitch uncertainty rate.

33. A method as recited in claim 20 wherein the bank angle adjustment factor is a function of a static roll boundary, dynamic roll boundary, the relative roll estimate, a loop time and a maximum ramp rate and a pitch uncertainty rate.

34. A method as recited in claim 20 further comprising measuring a pitch rate; and
adjusting the second reference road bank angle as a function of pitch rate.

35. A method as recited in claim 20 further comprising measuring a pitch rate; and
adjusting the second reference road bank angle as a function of pitch rate and a wheel lift status.

36. A method as recited in claim 20 further comprising measuring a pitch rate; and
adjusting the second reference road bank angle as a function of pitch rate, a wheel lift status and a convergent or non-convergent condition.

37. A method as recited in claim 20 further comprising adjusting the second reference road bank angle in response to an absolutely grounded condition.

38. A method as recited in claim 20 further comprising generating a wheel departure angle as a function of the second reference road bank angle and in response to an absolutely grounded condition.

39. A method as recited in claim 20 wherein the second reference road bank angle is determined as a function of roll acceleration.

40. A method as recited in claim 20 wherein the second reference road bank angle is determined as a function of lateral acceleration.

41. A method as recited in claim 20 wherein activating a safety device comprises one selected from the group consisting of an active brake control system, an active rear steering system, an active front steering system, an active anti-roll bar system, and an active suspension system.

* * * * *